United States Patent
Seok

(10) Patent No.: US 8,396,025 B2
(45) Date of Patent: Mar. 12, 2013

(54) METHOD OF OPERATING ACTIVE SCANNING TO CONFIGURE MESH NETWORK

(75) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 199 days.

(21) Appl. No.: 12/517,482

(22) PCT Filed: Jan. 9, 2009

(86) PCT No.: PCT/KR2009/000144
§ 371 (c)(1), (2), (4) Date: Jun. 3, 2009

(87) PCT Pub. No.: WO2009/088263
PCT Pub. Date: Jul. 16, 2009

(65) Prior Publication Data
US 2011/0013606 A1    Jan. 20, 2011

(30) Foreign Application Priority Data

Jan. 11, 2008  (KR) .................. 10-2008-0003626

(51) Int. Cl.
*H04W 4/00* (2009.01)
(52) U.S. Cl. ........................ 370/328; 370/338
(58) Field of Classification Search .................. None
See application file for complete search history.

(56) References Cited

U.S. PATENT DOCUMENTS

| | | | |
|---|---|---|---|
| 8,072,947 B2* | 12/2011 | Cho et al. ............... | 370/338 |
| 2002/0118664 A1* | 8/2002 | Ishibashi et al. ........ | 370/338 |
| 2005/0088980 A1* | 4/2005 | Olkkonen et al. ....... | 370/255 |
| 2005/0193357 A1 | 9/2005 | Honary et al. | |
| 2005/0232312 A1* | 10/2005 | Suzuki ..................... | 370/913 |
| 2006/0039298 A1 | 2/2006 | Zuniga et al. | |
| 2006/0111103 A1* | 5/2006 | Jeong et al. ............. | 455/434 |
| 2006/0268715 A1* | 11/2006 | Zuniga et al. ........... | 370/235 |
| 2006/0285528 A1* | 12/2006 | Gao et al. ............... | 370/338 |
| 2007/0050523 A1* | 3/2007 | Emeott et al. ........... | 709/248 |
| 2008/0065884 A1* | 3/2008 | Emeott et al. ........... | 713/168 |
| 2008/0095059 A1* | 4/2008 | Chu .......................... | 370/238 |
| 2008/0096580 A1* | 4/2008 | Montemurro ........... | 455/456.1 |
| 2008/0298333 A1* | 12/2008 | Seok ......................... | 370/338 |
| 2009/0116410 A1* | 5/2009 | Seok ......................... | 370/255 |
| 2009/0310516 A1* | 12/2009 | Goel et al. ............... | 370/254 |

(Continued)

FOREIGN PATENT DOCUMENTS

KR    10-2006-0099474 A    9/2006

OTHER PUBLICATIONS

IEEE, IEEE P802.11sTM/D1.03, Draft Standard for Information Technology-Telecommunications and information exchange between systems-Local and metropolitan area networks-Specific requirements-Part 11: Wireless LAN Medium Access Control (MAC) and Physical Layer (PHY) specification, Apr. 2007, All Pages.*

(Continued)

*Primary Examiner* — Otis L Thompson, Jr.
(74) *Attorney, Agent, or Firm* — Birch, Stewart, Kolasch & Birch, LLP

(57) ABSTRACT

A method of operating active scanning to configure a mesh network includes receiving a probe request frame from a mesh point (MP), the probe request frame comprising a Mesh Identifier (ID) information element, and transmitting a probe response frame to the MP when a Mesh ID in the Mesh ID information element is a wildcard Mesh ID or a specific Mesh ID.

2 Claims, 4 Drawing Sheets

U.S. PATENT DOCUMENTS

2010/0177755 A1\* 7/2010 Chu et al. .................. 370/338

OTHER PUBLICATIONS

IEEE, IEEE P802.11sTM/D1.07, Draft Standard for Information Technology-Telecommunications and information exchange between systems-Local and metropolitan area networks-Specific requirements-Part 11: Wireless LAN Medium Access Control (MAC) and Physical Layer (PHY) specifications, Sep. 2007, All Pages.\*

\* cited by examiner

METHOD OF OPERATING ACTIVE SCANNING TO CONFIGURE MESH NETWORK

TECHNICAL FIELD

The present invention relates to a mesh network, and more particularly, to a procedure of operating active scanning in which a mesh point finds an accessible mesh network to configure a mesh network.

BACKGROUND ART

With the advancement of information communication technologies, various wireless communication technologies have recently been developed. Among the wireless communication technologies, a wireless local area network (WLAN) is a technology whereby high-speed Internet access is possible in a wireless fashion in homes or businesses or in a region providing a specific service by using a portable terminal such as a personal digital assistant (PDA), a laptop computer, a portable multimedia player (PMP), etc.

It is assumed that WLAN communication conforming to the institute of electrical and electronics engineers (IEEE) 802.11 standard is achieved in a region called a basic service set (BSS). A BSS region may differ according to a propagation characteristic of a wireless medium, and thus has an ambiguous boundary. The BSS can be classified into two structures, i.e., an independent BSS (IBSS) and an infrastructured BSS. The former is to constitute a self-contained network and denotes a BSS in which access to a distribution system (DS) is not allowed. The latter includes one or more access points (APs), DSs, etc., and generally denotes a BSS in which the APs are used in all communication processes including communication between stations.

A station (STA) which intends to access to a wireless network can use two schemes to find an accessible wireless network (e.g., BSS or IBSS), that is, a candidate AP or the like.

A first scheme is passive scanning using a beacon frame transmitted from an AP (or STA). That is, the STA which intends to access to the wireless network can find an accessible BSS or IBSS by receiving the beacon frame periodically transmitted from the AP or the like which manages a corresponding BSS (or IBSS).

A second scheme uses active scanning. In this scheme, the STA which intends to access to the wireless network first transmits a probe request frame. Upon receiving the probe request frame, the STA or the AP responds by transmitting a probe response frame.

As a special type of network, a mesh network is defined in the WLAN. The mesh network may be defined as a network which supports direct communication between a plurality of wireless devices having a relay function without via an AP. Functionally, a distribution system (DS) of the AP can be replaced with an interoperable wireless link or a multi-hop path between the plurality of wireless devices. According to the mesh network, any one of the wireless devices can establish an interoperable peer-to-peer wireless link with other neighboring wireless devices and/or APs. Therefore, there is an advantage in that a wireless connection can be more flexibly established.

In the mesh network, one wireless device can be connected to a plurality of other wireless devices and thus can have a plurality of communication paths. Such a communication path between the wireless devices is also referred to as a wireless mesh link, or simply, a mesh link or a peer link. Such a wireless device is referred to as mesh point (MP), but may also be referred to other equivalent terminologies. Among MPs, an MP performing not only the aforementioned relay function but also an AP function is referred to as a mesh access point (MAP).

Such a mesh network has many advantages, e.g., flexibility of network implementation, reliability caused by a detour path, and reduction of power consumption resulted from a decreased communication distance, etc. More specifically, by using the mesh network, a network can be flexibly implemented between MPs in a place where there is no existing communication network. In addition, the mesh network can ensure a plurality of detour paths due to interconnections among a plurality of MPs. Therefore, even if one MP is erroneous, data can be transmitted through another path. Further, since the mesh network can perform communication via a neighboring MP even if a coverage of one MP is not large enough, telecommunication can be achieved with low power.

DISCLOSURE

Technical Problem

The aforementioned active scanning performed by an STA which intends to access to a wireless network cannot be directly used in a procedure in which an MP configures a new mesh network with another MP or accesses to an existing mesh network. This is because a non-MP STA (hereinafter, a non-AP not having an MP function is simply referred to as an STA), an MP, an MAP, a non-MP AP (hereinafter, an AP not having an MP function is simply referred to as an AP), etc., may coexist in the mesh network, and the STA or AP cannot be a candidate MP which denotes an MP that can configure the mesh network.

For example, the mesh network may transmit a probe request frame according to an active scanning procedure so that the STA can find an accessible BSS or IBSS. In this case, even if the probe request frame is received, the MP must not transmit a probe response frame in response thereto. This is because the received probe request frame is not for configuring the mesh network, that is, is not used by the MP to find the candidate MP capable of configuring the mesh network.

The MP may transmit the probe request frame to find an accessible mesh network. In this case, even if the probe request frame is received, the AP must not transmit the probe response frame in response thereto. This is because the received probe request frame is not used by the STA to find an accessible BSS (i.e., a candidate AP).

Therefore, the present invention provides an active scanning procedure in which an MP finds a mesh network (i.e., another MP) to join the mesh network or configures a new mesh network with another MP in a wireless network.

The present invention also provides a method capable of effectively using a mesh identifier (ID) information element in an active scanning procedure of a mesh network.

Technical Solution

In an aspect, a method of operating active scanning to configure a mesh network includes receiving a probe request frame from a mesh point (MP), the probe request frame comprising a Mesh Identifier (ID) information element, and transmitting a probe response frame to the MP when a Mesh ID in the Mesh ID information element is a wildcard Mesh ID or a specific Mesh ID.

In some embodiments, the Mesh ID information element may further comprise a length field to indicate a length of the Mesh ID. A value of zero (0) in the length field may indicate the wildcard Mesh ID. The wildcard Mesh ID may be a Mesh ID which specifies all MPs. The specific Mesh ID may be a Mesh ID of a MP which transmits the probe response frame.

In another aspect, a method of operating active scanning to configure a mesh network includes receiving a probe request frame from a MP, the probe request frame comprising a Mesh ID information element and an address one field, and transmitting a probe response frame to the MP when the address one field is a broadcast address or a specific MAC address and a Mesh ID in the Mesh ID information element is a wildcard Mesh ID or a specific Mesh ID.

In some embodiments, the address one field may be in a MAC header of the probe request frame and the Mesh ID information element may be in a body of the probe request frame.

In still another aspect, a method of operating active scanning to configure a mesh network includes generating a probe request frame, the probe request frame comprising a Mesh ID information element, the Mesh ID information element comprising a Mesh ID and a length field to indicate a length of the Mesh ID, and transmitting the probe request frame, wherein a value of the length field is set to zero (0) to find all MPs to configure the mesh network.

Advantageous Effects

According to an embodiment of the present invention, in an active scanning procedure in a mesh network, a probe request frame includes a mesh ID information element, and thus an MP receiving the frame can know that the received frame is the probe request frame for the MP. Therefore, the MP can respond to a mesh network configuration request only when the received probe request frame includes the mesh ID information element, and the MP can easily know that there is no need to respond to the probe request since the mesh ID information element is not included when the probe request frame is received from a non-MP STA. In addition, an AP other than the MP can also easily know that the AP does not have to respond upon receiving the probe request frame including the mesh ID information element.

In addition, according to an embodiment of the present invention, an MP which intends to configure a mesh network can specify a mesh network to be accessed by the MP by using a length field of the mesh ID information element or by using a mesh ID field together with the length field. In particular, if the length field is set to zero (0), the MP can announce to other MPs its intent to access to all mesh networks. An MP receiving the probe request frame can easily determine whether the probe response frame will be transmitted or not by using a value set on the mesh ID information element together with information set on an address-1 field.

MODE FOR INVENTION

Figure 1:
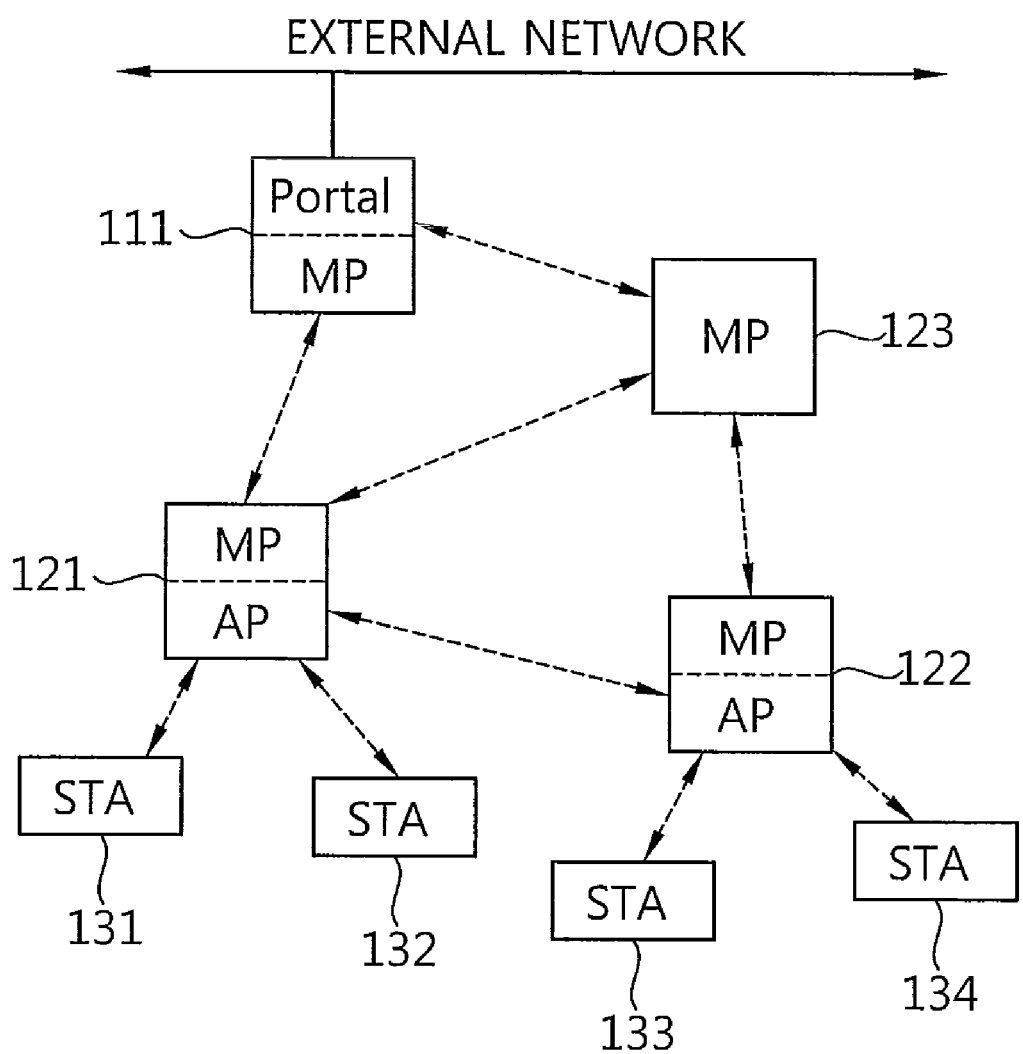
FIG. 1 shows an exemplary structure of a wireless mesh network.

FIG. 1 shows an exemplary structure of a wireless mesh network. The wireless mesh network has a unique mesh identifier. The mesh identifier is a shortened term used to identify a group of mesh points (MPs) constituting the wireless mesh network. There is no restriction on how to assign the mesh identifier.

Referring to FIG. 1, the wireless mesh network includes one or a plurality of stations (STAs) 131, 132, 133, and 134 and one or more wireless devices, i.e., MPs 111, 121, 122, and 123. Among these MPs, the MPs indicated by the reference numerals 121 and 122 are connected to the STAs 131, 132, 133, and 134. Thus, each of the MPs 121 and 122 acts as a mesh access point (MAP) defined as an MP which also functions as an AP. In addition, the MP indicated by the reference numeral 121 is an MP connected to an external network in a wired or wireless fashion, which is called a mesh portal.

Each of the STAs 131 to 134 is a non-access point (AP) station and is an arbitrary functional medium including a medium access control (MAC) and physical layer interface for a wireless medium, conforming to the institute of electrical and electronics engineers (IEEE) 802.11 standard. Further, each of the STAs 131 to 134 supports transmission and/or reception of an aggregated MAC service data unit (A-MSDU), and announces its multicast registration information to the connected MAP 121 or 122. In addition to the terminology of a wireless station, the STA may also be referred to as a wireless transmit/receive unit (WTRU), a user equipment (UE), a mobile station (MS), and a mobile subscriber unit, etc.

Each of the MPs 111, 121, 122, and 123 is a constitutional element of a wireless mesh network and is one of IEEE 802.11-based functional entities including the MAC and physical layer interface conforming to the IEEE 802.11 standard. Each of the MPs 111, 121, 122, and 123 is a wireless device supporting a mesh service. The mesh service includes various services for enabling direct communication between the MPs constituting the mesh network. Communication between two MPs (e.g., the MPs indicated by reference numbers 121 and 123) for providing the mesh service is achieved through a peer link or a mesh link which is a direct link established between the two MPs. Each of the MPs 111, 121, 122, and 123 finds one or more candidate MPs through active scanning or passive scanning, and thereafter establishes the mesh link with the candidate MPs according to a typical link establishment procedure.

In order for two or more MPs to configure a mesh network by establishing the peer link with each other or in order for another MP to participate in an existing mesh network, the same mesh profile has to be used between the MPs establishing the peer link. The MP supports at least one mesh profile. The mesh profile includes a mesh identifier (ID), a path selection protocol identifier, and a path selection metric identifier. In addition, the mesh profile may further include a congestion control mode identifier.

As described above, among the MPs, an MP which also functions as an AP is particularly referred to as an MAP. Therefore, in addition to the aforementioned functions of the MPs, each of the MAPs 121 and 122 also functions as an AP for an associated station having a connection established to the MAPs 121 and 122. In addition to the terminology of an access point, the AP may also be referred to as a centralized controller, a base station (BS), a node-B, a site controller, etc.

Figure 2:
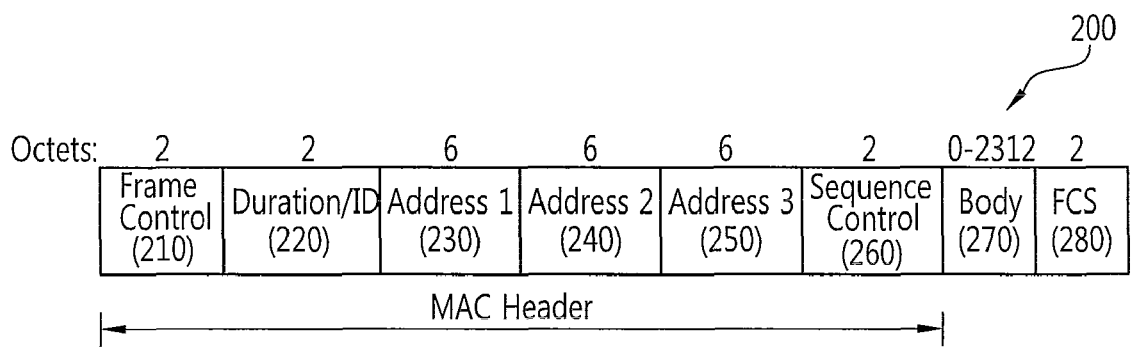
FIG. 2 shows an exemplary format of a probe request frame transmitted by a mesh point (MP) which intends to find a candidate MP in an active scanning procedure according to an embodiment of the present invention.

FIG. 2 shows an exemplary format of a probe request frame transmitted by an MP which intends to find a candidate MP in an active scanning procedure according to an embodiment of the present invention. Referring to FIG. 2, a probe request frame 200 includes a medium access control (MAC) header part, a body field 270, and a frame check sequence (FCS) field 280. The MAC header part includes a frame control field 210, a duration/ID field 220, an address-1 field 230, an address-2 filed 240, an address-3 field 250, and a sequence control field 260. The frame control field 210 may include a variety of information (e.g., protocol version, type, subtype, power management, reattempt, etc.) required to control the frame. The duration/ID field 220 may include information on a duration of a corresponding frame. The address-1 field 230 may include frame destination information (e.g., a broadcast MAC address or a MAC address of a specific MP to be accessed). The address-2 filed 240 may include a MAC address of an MP transmitting the probe request frame 200. The address-3 field 250 may be set to zero (0). The sequence control field 260 may include a sequence number field and a fragment number field.

The body field 270 of the probe request frame 200 includes a mesh ID element and may include a supported rates element, a request information element, a vendor specific element, etc. Among them, the mesh ID element is for identification of the mesh network, and is used to identify one group of MPs constituting a corresponding mesh network. In order to access to the mesh network, not only other requirements have to be satisfied, but also a matched mesh ID is required.

Figure 3:
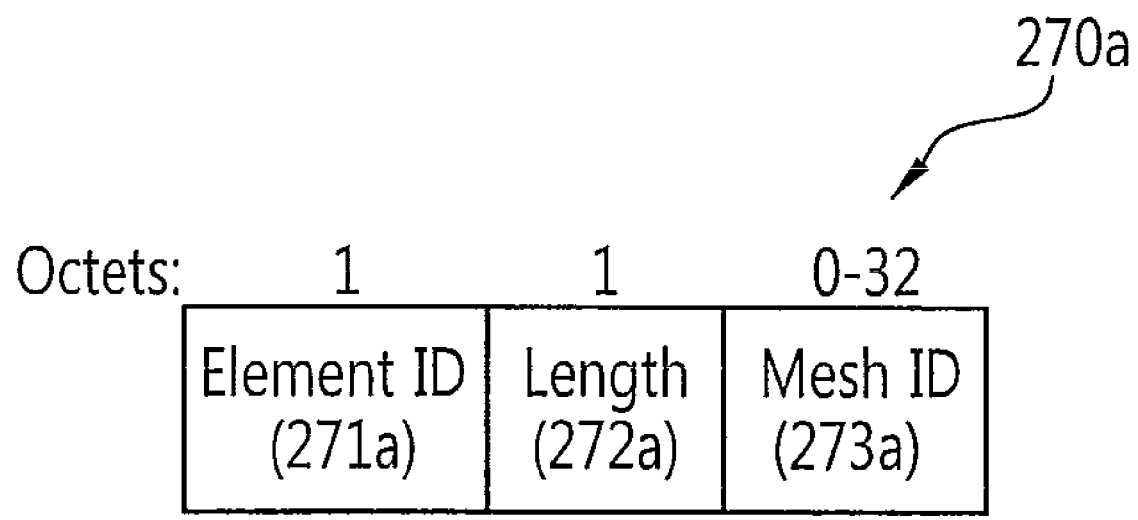
FIG. 3 shows a format of a mesh identifier (ID) element which can be included in a body field of a probe request frame of FIG. 2.

FIG. 3 shows a format of the mesh ID element. Referring to FIG. 3, a mesh ID element 270a includes an element ID field 271a, a length field 272a, and a mesh ID field 273a. The element ID field 271a may be set to a value indicating the mesh ID element 270a. The length field 272a may be set to a value indicating a length of data contained in the mesh ID field 273a. If the length field 272a is set to zero (0), no data is contained in the mesh ID field 273a. According to an embodiment of the present invention, a wildcard mesh ID may be indicated in this case. The mesh ID field 273a may be set to a value indicating a mesh ID.

Figure 4:
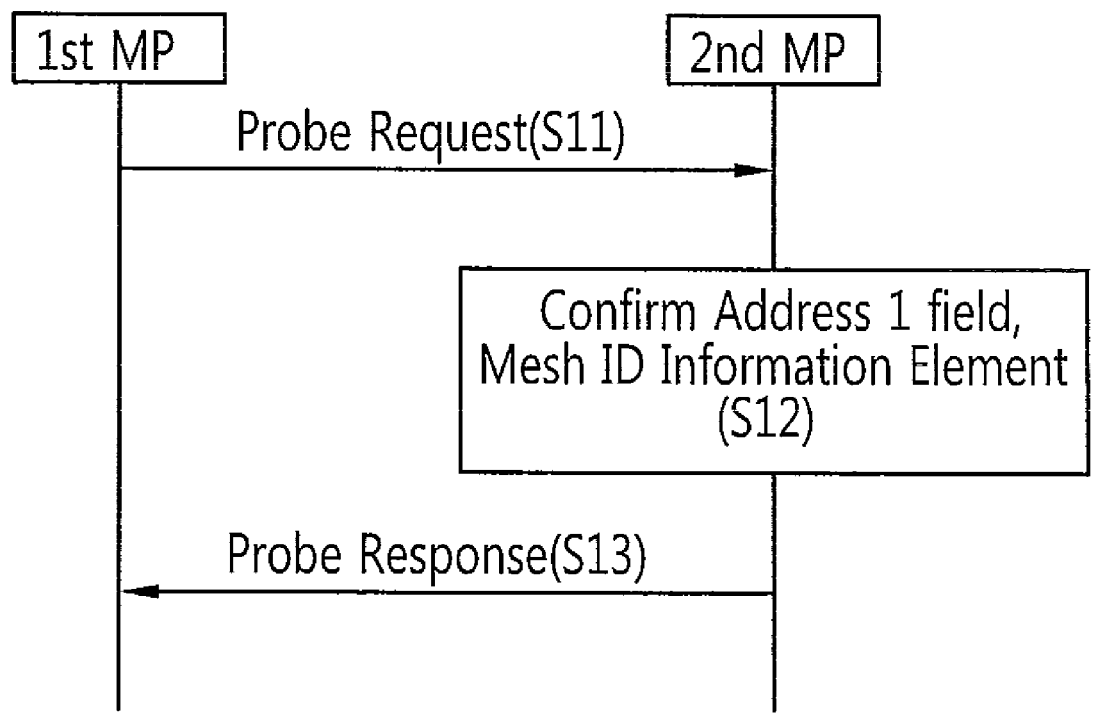
FIG. 4 is a flow diagram showing an active scanning procedure according to an embodiment of the present invention.

FIG. 4 is a flow diagram showing an active scanning procedure in a mesh network according to an embodiment of the present invention.

Referring to FIG. 4, a first MP which intends to find a mesh network to be accessed transmits the probe request frame 200 of FIG. 2 (step S11). The probe request frame may be transmitted by broadcast or unicast. In case of broadcasting the probe request frame, a receiving MP of the probe request frame is not specified, but the present invention is not limited thereto. For this, the address-1 field 230 of the probe request frame 200 may be set to a broadcast address or a MAC address of a specific MP, wherein the former is a case where the probe request frame is transmitted without specifying an MP to be accessed and the latter is a case where the MP to be accessed is specifically specified.

When the first MP intends to find all accessible mesh networks (i.e., mesh IDs) through the probe request frame, the length field 272a of the mesh ID element 270a of the probe request frame 200 may be set to zero (0). As described above, according to an embodiment of the present invention, setting the length field 272a of the mesh ID field to zero (0) may be regarded as specifying a mesh ID to a 'wildcard mesh ID'. On the other hand, when the MP intends to access to a specific mesh network, the mesh ID field 273a of the mesh ID element 270a of the probe request frame 200 may be set to a value indicating a mesh network to which the MP desires to access. Of course, in this case, the length field 272a is set to a value indicating a length of a value set on the mesh ID field 273a.

A second MP receiving the probe request frame 200 processes the probe request frame 200 according to a typical active scanning procedure, and particularly, probes the mesh ID element 270a of the address-1 field 230 of the received probe request frame 200 (step S12). More specifically, the second MP determines whether a value of the address-1 field included in the MAC header part of the probe request frame 200 is a broadcast address or is identical to a MAC address of the second MP. If the value of the address-1 field does not satisfy this condition, the second MP does not have to transmit the probe response frame even if the probe request frame is received from the first MP.

If the received address-1 field of the probe request frame 200 is the broadcast address or is identical to the MAC address of the second MP, the second MP also reads out the value set on the mesh ID element 270a from the probe request frame 200. This process is one of processes for determining whether the probe response frame is transmitted or not. Only when the value set on the mesh ID field 273a of the mesh ID element 270a of the received probe request frame is identical to an ID value of a mesh network currently accessed by the second MP or when the length field 272a of the mesh ID element 270a is set to zero (0), the second MP transmits the probe response frame to the first MP. Therefore, when the length field 272a of the probe request frame is set to another value other than zero (0) and when the value set on the mesh ID field 273a is different from an ID of a mesh network to which the second MP is registered, the second MP does not have to transmit the probe response frame for the received probe request frame.

Referring back to FIG. 4, if the address-1 field 230 of the probe request frame 200 and the value set on the mesh ID element 270a satisfy the condition described in step S12, the second MP transmits the probe response frame to the first MP (step S13). Since the format of the probe response frame is basically identical to the probe request frame of FIG. 2, detailed descriptions thereof will be omitted. However, in addition to a frame ID value, an information element included in the body field 270 of the probe response frame is different from an information element included in the body field of the frame request frame.

The probe response frame transmitted in the active scanning procedure in the mesh network may further include an information element unique to the mesh network, in addition to an information element (e.g., a timestamp, beacon interval, capability, supported rates, direct-sequence (DS) parameter set, contention-free (CF) parameter set, etc.) included in a probe response frame used in a typical wireless local area network (WLAN) other than the mesh network.

Table 1 shows an example of information elements that can be included in the body field of the probe response frame transmitted by the second MP in the active scanning procedure in the mesh network.

TABLE 1

| Order | Information | Notes |
|---|---|---|
| | Mesh ID | The Mesh ID information element may be present within Probe Response frames when dot11MeshEnabled is true. |
| | Mesh Configuration | The Mesh Configuration information element may be present within Probe Response frames when dot11MeshEnabled is true. |
| | Mesh Neighbor List | The Mesh Neighbor List information element may be present within frames with the DTIM bit set when both dot11MeshEnabled is true and the MP transmits to other MPs in power save mode. |

TABLE 1-continued

| Order | Information | Notes |
|---|---|---|
| | Mesh TIM | The Mesh TIM element may be present within Probe Response frames only when both dot11MeshEnabled is true and MP supports Power Save mode. |
| | Mesh ATIM Window | The Mesh ATIM window parameter element may be present only when both dot11MeshEnabled is true and the MP intends to operate in power save mode. |
| | Beacon Timing | The Beacon Timing information element may be present within Probe Response frames when dot11 MeshEnabled is true. |
| | MDAOP Advertisements | The MDAOP Advertisements information element may be present within Beacon frames when dot11 MeshEnabled is true and the MP supports MDA. |
| | MSCIE | The MSCIE element may be present when dot11MeshEnabled is true. |

Referring to Table 1, it can be seen that the body field of the probe response frame unique to the mesh network can further include a mesh ID information element, a mesh configuration information element, a mesh neighbor list information element, a beacon timing information element, etc.

According to an embodiment of the present invention, in an active scanning procedure in a mesh network, a probe request frame includes a mesh ID information element, and thus an MP receiving the frame can know that the received frame is the probe request frame for the MP. Therefore, the MP can respond to a mesh network configuration request only when the received probe request frame includes the mesh ID information element, and the MP can easily know that there is no need to respond to the probe request since the mesh ID information element is not included when the probe request frame is received from a non-MP STA. In addition, an AP other than the MP can also easily know that the AP does not have to respond upon receiving the probe request frame including the mesh ID information element.

In addition, according to an embodiment of the present invention, an MP which intends to configure a mesh network can specify a mesh network to be accessed by the MP by using a length field of the mesh ID information element or by using a mesh ID field together with the length field. In particular, if the length field is set to zero (0), the MP can announce to other MPs its intent to access to all mesh networks. An MP receiving the probe request frame can easily determine whether the probe response frame will be transmitted or not by using a value set on the mesh ID information element together with information set on an address-1 field.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of wirelessly communicating via a wireless mesh network, comprising:
  receiving at a first station a probe request frame from a second station, the probe request frame including a medium access control (MAC) header, a mesh identification (ID), and a length field to indicate a length of the mesh ID, wherein the MAC header includes an address field associated with address matching for the first station;
  determining whether the address field of the probe request frame includes one of a broadcast address and a specific MAC address of the first station; and
  when the address field of the probe request frame includes one of the broadcast address and the specific MAC address of the first station, transmitting, in response to the probe request frame, a probe response frame to the second station, if the mesh ID of the probe request frame is a specific mesh ID of the first station or a wildcard mesh ID,
  wherein the probe response frame is not transmitted, in response to the probe request frame, to the second station when the address field of the probe request frame does not include one of the broadcast address and the specific MAC address of the first station, and
  wherein the probe response frame is not transmitted, in response to the probe request frame, to the second station when the mesh ID of the probe request frame does not include one of the specific mesh ID of the first station and the wildcard mesh ID.

2. A station for wirelessly communicating via a wireless mesh network, comprising:
  a processor configured to:
    receiving at a first station a probe request frame from a second station, the probe request frame including a medium access control (MAC) header, a mesh identification (ID), and a length field to indicate a length of the mesh ID, wherein the MAC header includes an address field associated with address matching for the first station;
    determining whether the address field of the probe request frame includes one of a broadcast address and a specific MAC address of the first station; and
    when the address field of the probe request frame includes one of the broadcast address and the specific MAC address of the first station, transmit, in response to the probe request frame, a probe response frame to the second station, if the mesh ID of the probe request frame is a specific mesh ID of the first station or a wildcard mesh ID,
    wherein the probe response frame is not transmitted, in response to the probe request frame, to the second station when the address field of the probe request frame does not include one of the broadcast address and the specific MAC address of the first station, and wherein the probe response frame is not transmitted, in response to the probe request frame, to the second station when the mesh ID of the probe request frame does not include one of the specific mesh ID of the first station and the wildcard mesh ID.

* * * * *